United States Patent [19]

Hatcher

[11] Patent Number: 4,720,153

[45] Date of Patent: Jan. 19, 1988

[54] STORAGE RACK FOR MAGNETIC TAPE CARTRIDGES

[75] Inventor: David O. Hatcher, Williamsville, N.Y.

[73] Assignee: Mead-Hatcher, Inc., Buffalo, N.Y.

[21] Appl. No.: 1,741

[22] Filed: Jan. 9, 1987

[51] Int. Cl.[4] ............................................. A47B 81/06
[52] U.S. Cl. ........................................ 312/13; 312/9; 206/387
[58] Field of Search .................... 312/13, 8, 9, 10, 14, 312/123, 133; 211/40; 206/387

[56] References Cited

U.S. PATENT DOCUMENTS

| 739,581 | 9/1903 | Bragunier | 312/286 |
|---|---|---|---|
| 1,182,233 | 5/1916 | Waddell | 312/13 |
| 1,192,299 | 7/1916 | Goebel | 211/40 |
| 3,245,736 | 4/1966 | Douthit . | |
| 3,666,337 | 5/1972 | Sztorc | 206/387 |
| 4,239,109 | 12/1980 | Nielsen et al. | 312/13 |
| 4,285,557 | 8/1981 | Paladino et al. | 312/13 |
| 4,312,548 | 1/1982 | Posso | 312/9 |
| 4,317,603 | 3/1982 | Pepicelli et al. | 312/13 |
| 4,549,775 | 10/1985 | Carter . | |
| 4,577,914 | 3/1986 | Stravitz | 206/387 |
| 4,600,107 | 7/1986 | Price et al. | 312/8 |
| 4,630,737 | 12/1986 | King | 312/13 |

FOREIGN PATENT DOCUMENTS

| 1451923 | 10/1976 | United Kingdom | 211/40 |
|---|---|---|---|
| 2132075 | 7/1984 | United Kingdom | 312/8 |

*Primary Examiner*—Victor N. Sakran
*Attorney, Agent, or Firm*—Christel, Bean & Linihan

[57] ABSTRACT

A storage rack for magnetic tape cartridges includes a plurality of shelves for supporting a plurality of cartridges in an upstanding side-by-side relationship and side supports for supporting the shelves in a spaced superposed relationship. Each shelf includes a planar platform for cartridges operatively positioned thereon and a planar back for the shelf. The planar platform defines a substantially linear forward edges opposite the back of the shelf which underlies a tape cartridge operatively positioned upon the shelf and supports the tape cartridge so that the overlying cartridge edge defines an angle within the range of about ten to twenty degrees with the horizontal. The platform of one shelf is spaced above the platform of the underlying shelf a distance which is substantially no greater than the vertical height of a cartridge when positioned upon the underlying shelf plus an amount providing finger clearance between the underside of the platform of the one shelf and the upper edge of a cartridge when positioned upon the underlying shelf so that an index finger of one hand can be positioned atop a cartridge stored upon the underlying shelf at a location on the cartridge adjacent the upper forward corner of the cartridge and the cartridge pivoted forwardly with the index finger relative to the underlying shelf about the corresponding forward edge from a stored condition to a forwardly-tilted condition in relationship to adjacent cartridges so that the opposite sides of the cartridge can be grasped between the thumb and remaining fingers of the one hand for purposes of withdrawing the cartridge from the underlying shelf.

23 Claims, 8 Drawing Figures

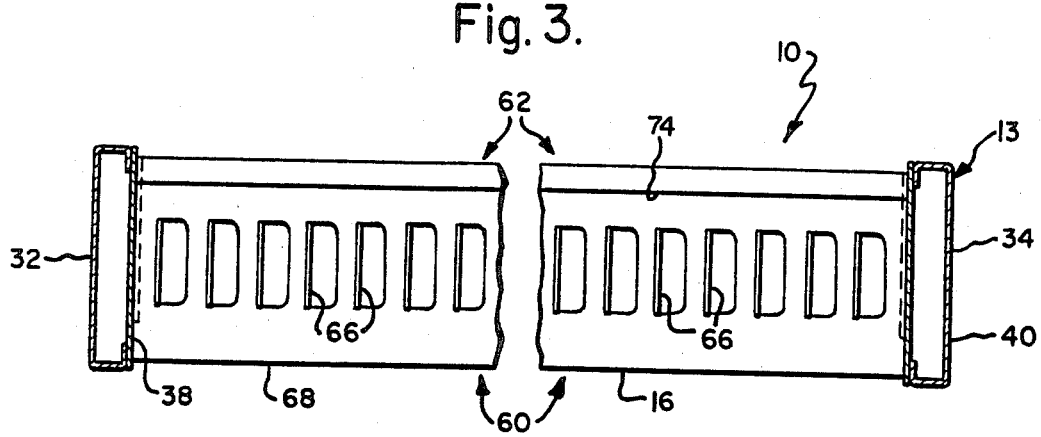
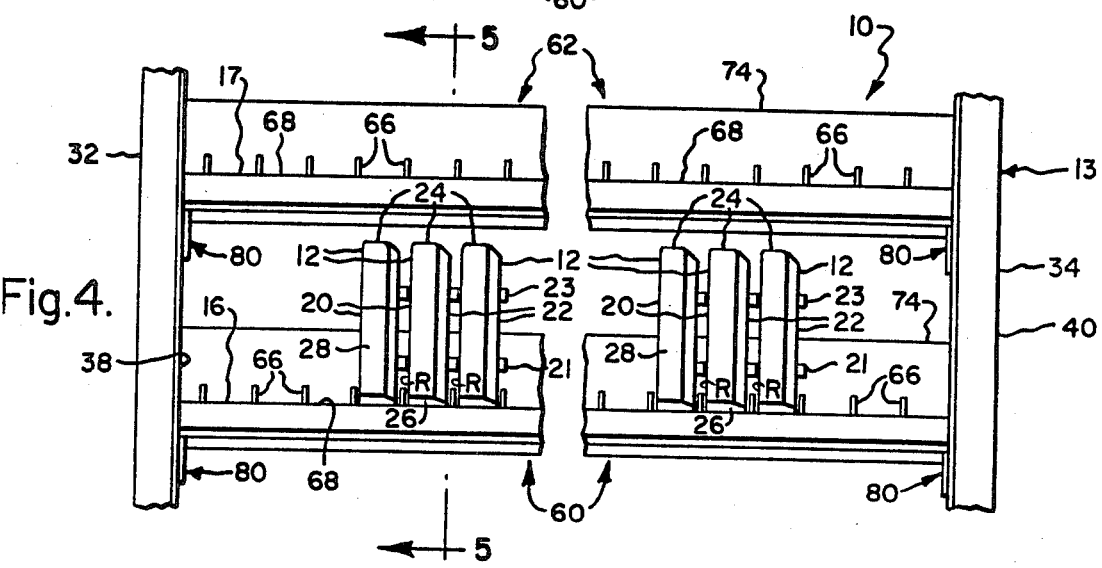
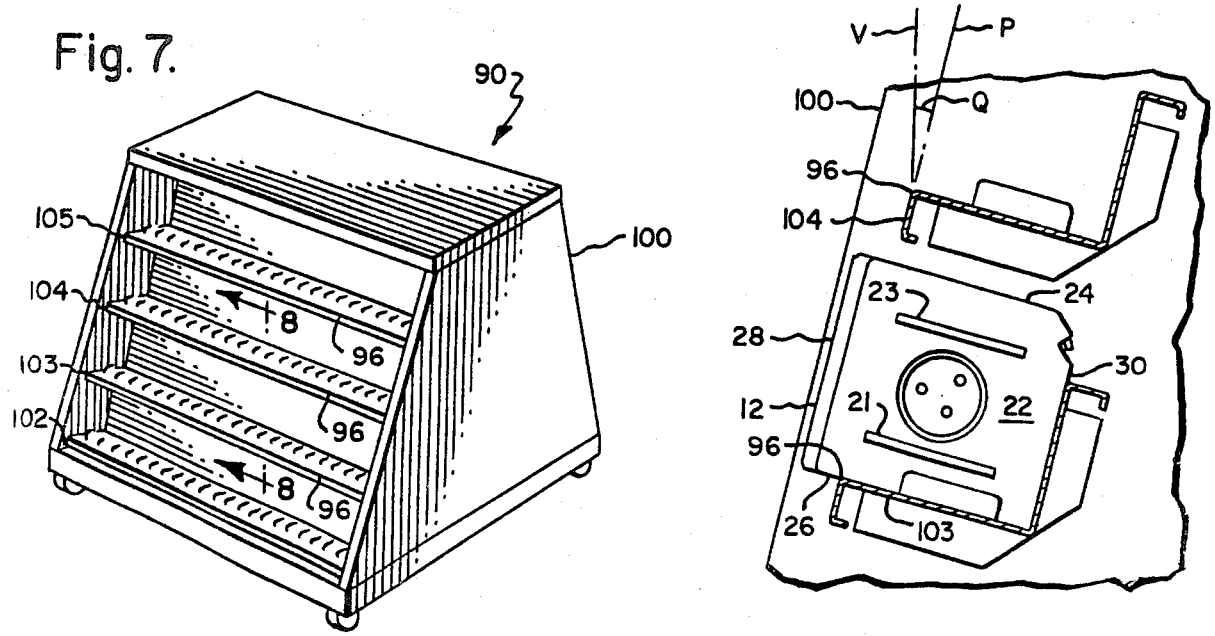

STORAGE RACK FOR MAGNETIC TAPE CARTRIDGES

BACKGROUND OF THE INVENTION

This invention relates generally to shelving apparatus and relates more particularly to shelf-defining racks within which magnetic tape cartridges are stored.

Conventional racks with which this invention is concerned include shelves for accepting and storing magnetic tape cartridges placed upright and edgewise thereupon so that the stored cartridges are arranged in a plurality of rows and the cartridges in each row are arranged in side-by-side relationship. Typically, an exposed edge of each cartridge bears a label for purposes of identifying the cartridge.

When embodied in the form of a floor-standing model, the conventional rack commonly includes a plurality of lowermost shelves arranged in a superposed relationship spaced relatively close to the floor so that a person searching for a cartridge positioned upon one of these lowermost shelves must often bend or stoop from a standing position in order to read the labels borne by the cartridges positioned upon these shelves. Such bending is almost always required if the person searching for the cartridge must stand relatively close to the rack such as is the case if there exists only a relatively narrow walkway or aisle extending along the front of the rack. It is known, however, that such a rack can be constructed so that the labels borne by cartridges in the lowermost shelves are viewable by a person standing alongside the rack so that the person need not stoop to remove a cartridge until the desired cartridge is spotted. In such a construction, the lowermost shelves are oriented in a canted relationship so that the label-bearing edges of the cartridges positioned thereupon are contained generally in a single plane oriented at an angle relative to the vertical to thereby expose the cartridge labels to a person standing alongside the racks.

Commonly, a rack of the aforedescribed construction has a base which must be sufficiently wide enough, as the rack is measured from front to back, to accommodate the aforedescribed canting of the lowermost shelves. Accordingly, the base of the rack protrudes forwardly of the remainder of the rack to accommodate the aforedescribed canting. However, the floor space requirements for such a rack may render such a rack undesirable, particularly in rooms in which floor space for cartridge storage is costly due to air-conditioning, security, and fire-prevention requirements.

In addition to the amount of floor space commonly required by conventional racks, another limitation associated with conventional racks relates to the general difficulty of removing individual tape cartridges from the rack. For example, a cartridge may be framed so closely between two adjacent cartridges and beneath an overhanging shelf that the edges or opposite sides of the cartridge are difficult to grasp for purposes of removing of the cartridge. Furthermore, in some instances, the grasping of a cartridge for removal purposes is a cumbersome two-handed operation.

It is known that each shelf of such a conventional rack can be separated by appropriate dividers into spaced cartridge-receiving receptacle slots to facilitate the grasping of opposite sides of the cartridge, but such dividers can significantly reduce the amount of cartridge storage space available along the length of the shelf. It is also known that any of various types of spring mechanisms can be mounted at the back of a shelf and behind each cartridge is depressed against the spring mechanism and suddenly released to a condition relative to adjacent cartridges at which the opposite sides of the cartridge can be grasped. However, such spring mechanisms can significantly contribute to cost of a rack.

It is an object of the present invention to provide a new and improved storage rack for magnetic tape cartridges which when constructed in the form of floor-standing rack requires less floor space than does a conventional floor-standing rack yet is adapted to support cartridges in such a manner that identification labels borne by an edge of each cartridge stored thereon are easily viewable by a person standing alongside the rack.

Another object of the present invention to provide such a storage rack in which cartridges can be stored in a compact, space-conserving arrangement and from which individual tape cartridges can be easily removed with one hand.

Still another object of the present invention is to provide such a storage rack having shelves wherein the density for cartridge storage is effectively maximized along the length of the shelves.

Yet still another object of the present invention is to provide such a storage rack having superposed shelves wherein the vertical density for cartridge storage is enhanced.

A further object of the present invention is to provide such a storage rack which is economical to construct and effective in operation.

A still further object of the present invention is to provide such a storage rack having shelves which strongly resist a forward shifting of cartridges positioned thereupon due to an accidental jarring or a shaking of the rack to thereby enhance the storage security of cartridges positioned upon the rack shelves.

A yet still further object of the present invention is to provide such a storage rack which is particularly well-suited for storing magnetic tape cartridges of the type, or comparable to the type, manufactured by IBM and known as the 3480 magnetic tape cartridge.

SUMMARY OF THE INVENTION

This invention resides in a new and improved storage rack for magnetic tape cartridges.

The storage rack includes shelf means having means defining at least two shelves for supporting a plurality of magnetic tape cartridges in an upstanding, side-by-side relationship and means for supporting the shelves in a superposed relationship so that one shelf is positioned generally above the other shelf. Each shelf includes means defining a back for the shelf and a platform for tape cartridges operatively positioned thereupon wherein the platform defines a substantially linear forward edge. The supporting means supports each shelf so that its forward edge is arranged substantially horizontally and each shelf platform is oriented so that the edge of a tape cartridge operatively overlying the platform is canted rearwardly and downwardly from the corresponding forward edge so that the overlying cartridge edge defines an acute angle with the horizontal wherein the aforesaid acute angle is within the range of about ten to twenty degrees. The forward edge of each shelf is arranged so as to be overhung by a cartridge stored thereupon. Furthermore, the platform-defining means of one shelf is spaced above the platform-defining means of the other shelf a distance which is substantially no greater than the vertical height of a cartridge when positioned upon the other shelf plus an amount providing finger clearance between the underside of the platform-defining means of the one shelf and the upper edge of a cartridge when positioned upon the other shelf so that an index finger of one hand can be placed atop a cartridge stored upon the other shelf and the cartridge pivoted forwardly with the index finger relative to the other shelf about the corresponding forward edge from a stored condition to a forwardly-tilted condition in relationship to adjacent cartridges so that the opposite sides of the cartridge can be grasped between the thumb and remaining fingers of the one hand for purposes of withdrawing the cartridge from the other shelf.

BRIEF DESCRIPTION OF THE DRAWING FIGURES

FIG. 3 is a fragmentary cross-sectional view taken about on line 3—3 of FIG. 2.

FIG. 4 is an fragmentary elevational view of the front of the FIG. 1 rack illustrating a plurality of tape cartridges when operatively positioned therein.

FIG. 7 is a perspective view of an alternative embodiment of a storage rack in accordance with the present invention.

FIG. 8 is a fragmentary cross-sectional view taken about on line 8—8 of FIG. 7 illustrating a cartridge operatively positioned upon one of the shelves of the FIG. 7 rack.

DETAILED DESCRIPTION OF THE PREFERRED EMBODIMENT

Figures 1, 2, 5, 6:
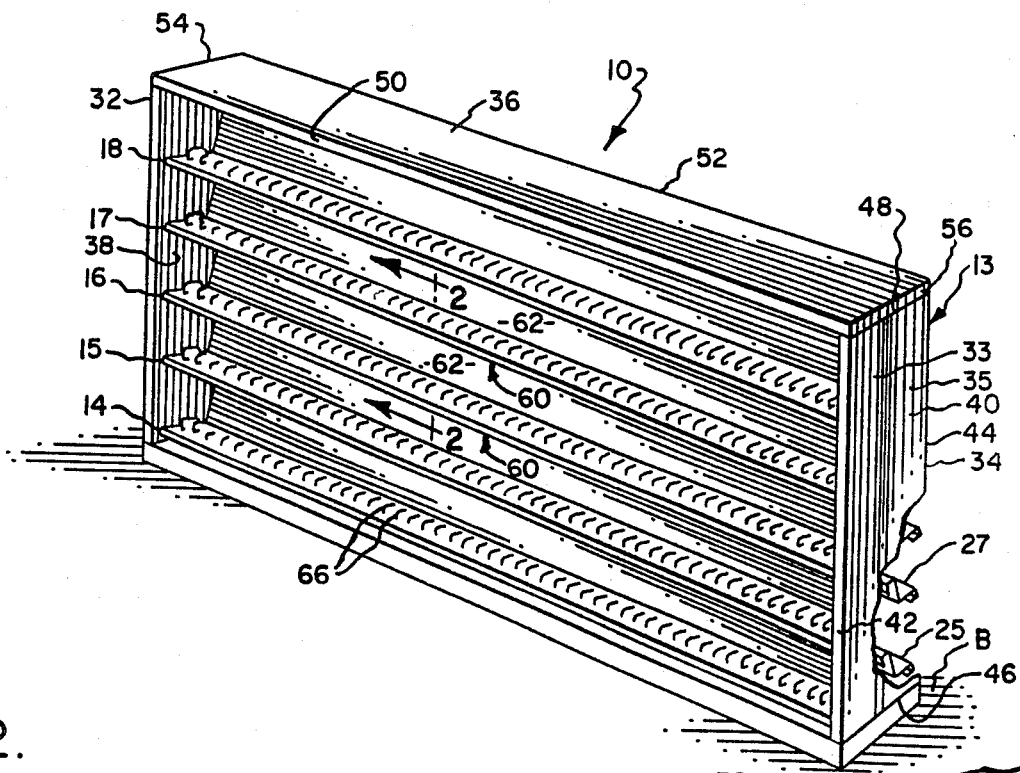
FIG. 1 is a perspective view, shown partially cutaway, of an embodiment of a storage rack in accordance with the present invention.
FIG. 2 is a fragmentary cross-sectional view taken about on line 2—2 of FIG. 2.
FIG. 5 is a cross-sectional view taken about on line 5—5 of FIG. 4 illustrating the operative positioning of a finger upon a cartridge for the purpose of tilting the cartridge forwardly from a stored condition to a forwardly-tilted condition.
FIG. 6 is a view similar to FIG. 5 illustrating the positioning of the FIG. 5 cartridge in a forwardly-tilted condition and the operative grasping of the cartridge for purposes of removing the cartridge from the rack.

Turning now to the drawings in greater detail and considering first FIG. 1, there is illustrated an embodiment, generally indicated 10, of a tape storage rack in accordance with the present invention and shown positioned upon a floor B. The storage rack 10 includes a plurality of shelves 14, 15, 16, 17, 18 facing forwardly of the rack 10 for supporting magnetic tape cartridges 12,12 (FIG. 4) in a plurality of horizontally-arranged rows. The rack 20 further includes support means, generally indicated 13, for supporting the shelves 14–18 in a stacked or superposed relationship so that all but the lowermost shelf 14 is positioned generally and immediately above another shelf in the rack 10. As will be apparent hereinafter, the shelves 14–18 are each of such size and arranged relative to one another that an individual tape cartridge 12 stored upon any of the shelves can be easily removed therefrom.

The rack embodiment 10 has been constructed to store magnetic tape cartridges 12,12 of the type commonly known as or comparable to the IBM 3480 magnetic tape cartridge. With reference to FIGS. 4 and 5, the tape cartridge 12 has an outside surface shaped somewhat in the form of a rectangular prism having two opposite and substantially parallel faces or sides 20,22 an upper edge 24, a lower or bottom edge 26, a forward edge 28 and a rearward edge 30. The height of the IBM 3480 magnetic tape cartridge as measured between the top and lower edges 24 and 26, respectively, is about 4.3 inches (10.9 cm), the length of the IBM cartridge as measured between the forward and rearward edges 28 and 30, respectively, is about 4.8 inches (12.2 cm), and the width of the IBM cartridge as measured between the sides 20 and 22 is about 1.0 inches (2.5 cm). Commonly, and with reference to FIG. 5, each tape cartridges 12 includes a pair of ribs 21,23 extending along one side face 22 of the cartridge. Each rib 21 or 23 is raised so as to protrude outwardly from the planar portion of the side face 22 so that when the side face 22 of one cartridge 12 is placed against the side face 20 of another cartridge 12, the ribs 21,23 of the side face 22 flatly engage the side face 20 of the other cartridge 12. Each rib 21 or 23 is arranged along linear path oriented generally parallel to the bottom edge 26. In the IBM 3480 cartridge, the rib 21 is spaced 0.8 inches (2 cm) from the bottom edge 26 and is raised from the planar portion of the side face 22 about 0.03 inches (0.01 cm).

With reference again to FIG. 1, the supporting means 13 includes a pair of upstanding side supports 32,34 each comprised of a pair of coplanar pieces 33,35 for supporting the rack as a free-standing structure and a top member 36 extending between the side supports 32,34. Each side support 32 or 34 is generally planar in shape, defines an inside surface 38, an outside surface 40, a forward edge 42, a rearward edge 44, a bottom edge 46 and a top edge 48. The top member 36 is also planar in shape and defines a forward edge 50, a rear edge 52 and two opposite side edges 54,56. As shown in FIG. 1, the bottom edges 46,46 rest upon the floor 8, and the side supports 32,34 are oriented generally vertically and in parallel relationship with one another. The side edge 54 of the top member 36 is fixed to the top edge 48 of the side support 32 and the side edge 56 of the top member 36 is fixed to the top edge 48 to the side support 34 to join and stabilize the side supports 32 and 34. The support means 13 of the rack embodiment 10 is constructed of sheet material, such as sheet steel, but it will be understood that any of a number of suitable materials can be used.

The rack 10 includes, in addition to the previously-mentioned, or first set of shelves 14–18, a second set of shelves, such as the ones indicated 25,27, arranged in superposed relationship on the rearward side of the rack 10 so that each shelf of the second set is arranged in a back-to-back relationship with a corresponding shelf of the first set of shelves and open or face generally in a direction opposite the direction faced by each shelf of the first shelf set. Accordingly, the width of the side supports 32,34 as measured between the forward and rearward edges 42,44 is sufficient to accommodate the width of the back-to-back arrangement of shelves. Furthermore, inasmuch as the rearward side of the rack 10 including the second set of shelves are identical in construction to that of the first set of shelves 14–18 with the exception being that the shelves of the second set face opposite the direction in which the shelves 14–18 of the first shelf set face, the ensuing discussion will address only the first set of shelves 14–18 with it being understood that the ensuing description of shelves 14-18 applies to the shelves of the second set.

As exemplified by the shelf 16 of FIGS. 2 and 3, each shelf 14, 15, 16, 17 or 18 includes means, indicated 60, defining a platform for a tape cartridge 12 operatively positioned thereupon and means, indicated 62, defining a back for the shelf. The support means 60 includes a substantially planar support surface 64 defining a forward edge 68 and a rearward edge 70 and a plurality of relatively thin, upstanding dividers 66 disposed along the length of the support surface 64. As best shown in FIG. 2, each divider 66 is relatively short in height in comparison to its length and is arranged in spaced and parallel relationship with its adjacent divider 66.

The dividers 66 serve the dual function of separating the platform means 60,60 into a plurality of individual cartridge-accepting receptacles 67,67 and providing means by which each cartridge 12 is operatively supported upright upon a shelf. In the rack embodiment 10, the dividers 66 are each constructed of twenty gauge sheet steel having a thickness which is less than the protruding height (i.e., 0.03 inches) of the ribs 21,23 of the 3480 cartridge and are each spaced from an adjacent divider 66 a distance slightly greater than the thickness of a tape cartridge to be stored upon a shelf of the rack 10 so that each receptacle 67 can slidably, receive a cartridge inserted edgewise therein. Furthermore and with reference again to FIG. 4, there is defined between each pair of side-by-side cartridges 12,12 and beneath a rib 21 a region R for receiving a divider 66 when the two side-by-side cartridges 12,12 are positioned on opposite sides of the divider 66. Therefore, no cartridge storage space is sacrificed along the length of each shelf by the inclusion of the dividers 66 in the rack 10 so that the cartridge storage density as viewed horizontally, or along the length of each shelf, of the rack 10 is effectively maximized.

In accordance with the present invention and with reference to FIG. 5, the forward edge 68 of each shelf 14, 15, 16, 17 or 18 is oriented transversely of and arranged beneath the bottom edge 26 of a cartridge 12 operatively positioned upon the corresponding shelf so that the forward edge 68 acts as a fulcrum about which the lower edge 26 of the cartridge 12 is pivoted or rocked forwardly relative to the corresponding shelf from the stored condition of the cartridge 12, as illustrated. It will be understood that as the cartridge 12 is pivoted forwardly as aforesaid, the cartridge bottom edge 26 moves in rolling contact with and about the edge 68. To this end, the depth of the platform means 60 as measured between the forward and rearward edges 68 and 70, respectively, and upon which the lower edge 26 of the cartridge 12 is adapted to rest when operatively stored thereon is shorter than the length of the bottom edge 26 of the cartridge 12 positionable upon the shelf. Therefore and as shown in FIG. 5, when a cartridge 12 is operatively positioned upon a shelf of the rack 10, the lower edge 26 overhangs so as to extend forwardly of the forward edge 68. In the rack embodiment 10, the length of the support means 60 as measured between the forward and rearward edges 68 and 70, respectively, is about 0.83 times the length of the cartridge bottom edge 26 (or about 4 inches or 10 cm if the cartridge 12 is an IBM 3480 cartridge), but it is believed that in accordance with the broader aspects of the present invention, the length of the support means can be between 0.75 and 0.90 times the length of the bottom edge 26 of the cartridge positionable upon a shelf of a rack in accordance with the present invention.

With reference again to FIGS. 1 and 2, the back means 62 of the rack 10 is platen-like in shape so as to define a planar backing surface 72 having an upper edge portion 74 and a lower edge portion 76. The back means 62 is arranged relative to the platform means 60 so that the plane of the backing surface 72 is oriented at a right angle to the plane of the support surface 64.

With reference still to FIG. 2, the rack embodiment 10 includes means, generally indicated 80, for attaching each shelf 14,15,16, 17 or 18 to the supporting means 13. In the rack embodiment 10, the attaching means 80 includes a pair of flanges 82,84 defined at each end of each shelf which provide surfaces oriented at a right angle to the support surface 64 and back means 67 for engaging the inside surface 38 of a corresponding side support 32 or 34. The flanges 82,84 at each shelf end are affixed to a corresponding one of the side supports 32,34 to thereby join the shelves to the supporting means 13. In the rack embodiment 10, each shelf 14,15, 16, 17 or 18 is comprised of a single piece of thin-guaged sheet metal, such as twenty gauge sheet steel, which has been appropriately cut and bent along appropriate fold lines so that the platform means 60, the back means 62 and each of the end flanges 82 or 84 are formed from a single piece of sheet metal. The dividers 66,66 have been formed out of the single piece by, for example, a lancing and forming process. The flanges 82,84 and the side supports 32,34 of the rack 10 are attached by welds.

In further accordance with the present invention and with reference again to FIG. 5, the platform means 60 is supported by the side supports 32,34 so that the lower edge 26 of a tape cartridge 12 operatively positioned upon a shelf of the rack 10 is inclined or canted rearwardly and downwardly from the forward edge 68. To this end, the platform means 60 of each shelf is supported so that its planar support surface 64 is inclined so as to define an acute angle, indicated A, with the horizontal, indicated H, when the platform means 60 is viewed in cross section and from one side thereof as illustrated in FIG. 5. In the rack embodiment shown, the acute angle A is about fifteen degrees, but it is believed that the acute angle A can be in the range from about ten degrees to about twenty degrees in accordance with the broader aspects of this invention.

As mentioned earlier, the shelves 14-18 of the rack embodiment 10 are supported by the supporting means 13 in a stacked or superposed relationship so that each shelf 15, 16, 17 or 18 is arranged immediately above a shelf 14, 15, 16, or 17, respectively. In accordance with the present invention, there exists spacing between the platform means 60,60 of adjacent shelves, such as shelves 16, 17 of FIG. 5, which is substantially equal to and no greater than the projected vertical height, indicated D, of a cartridge 12 when positioned upon the lower of the adjacent shelves and measured from the corresponding forward edge 68 plus an amount providing finger clearance between the underside of the platform means 60 of the upper of the adjacent shelves and the upper edge of a cartridge 12 when positioned upon the lower of the adjacent shelves. Furthermore, there exists sufficient spacing, indicated S in FIG. 5, between the overhanging shelf 15, 16, 17 or 18 and the top edge 48 of a cartridge 12 positioned upon the shelf immediately beneath the overhanging shelf that the cartridge 12 can be rocked or pivoted forwardly about the forward edge 68 with a finger positioned atop the cartridge 12 from a stored condition as shown in FIG. 5 to a forwardly-tilted condition as shown in FIG. 6. In the aforesaid forwardly-tilted condition, portions of the opposite sides 20,22 of the cartridge 12 protrude forwardly of the adjacent cartridges 12,12 so that the forwardly-tilted cartridge 12 can be grasped by its sides 20,22 in a manner hereinafter described.

With reference still to FIG. 5, the cartridge 12 can be pivoted forwardly from the illustrated stored condition through an angle T about the forward edge 28 before the top edge 24 of the cartridge 12 strikes the underside of the platform means 60 of the overhanging shelf. In the rack embodiment 10, the angle T is about thirty degrees, but it is believed that the angle T can be as low as ten degrees and the portions of the cartridge sides 20,22 protruding forwardly of adjacent cartridges 12,12 still be sufficiently exposed for grasping purposes. Because of the relatively close vertical spacing of the rack shelves 14–18 discussed above, it is believed that the vertical storage density for cartridges stored upon the rack 10 is relatively great and thereby desirably enhanced.

The steps involved in removing the tape cartridge 12 from the corresponding shelf 16, and with reference to FIGS. 5 and 6, include an initial step of placing an index finger F of one hand 6 upon the top edge 24 of the cartridge 12. The finger F is then moved forwardly to pull or pivot the top edge 24 of the cartridge 12 forwardly relative to the shelf 16 and generally in the direction of the arrow C from the FIG. 5 stored condition to the FIG. 6 forwardly-tilted condition. With the cartridge 12 in the FIG. 6 condition, the portions of the cartridge sides 20,22 which protrude forwardly of the adjacent cartridges 12,12 can then be simply grasped by squeezing the cartridge 12 between the thumb J and remaining fingers of the hand G and withdrawing the cartridge 12 from the underlying shelf 16 with the hand G.

With the finger F positioned atop the cartridge 12 as illustrated in FIG. 5, the thumb J and remaining fingers K are arranged in position adjacent the forward edge 28 of the cartridge 12 for grasping the cartridge sides 20,22 when the cartridge 12 is moved to the FIG. 6 forwardly-tilted condition. Hence, it will be understood that an individual cartridge 12 can be easily and quickly removed from a shelf in the rack 10 with a relatively quick motion of a single hand.

In addition to the above-described advantage of the rack 10 directed to the ease with which tape cartridges 12,12 can be individually removed therefrom, an additional advantage provided by the rack 10 of this invention is directed to the rearward inclination or canting of the support surface 64 relative to the forward edge 68 of the corresponding shelf. The aforesaid rearward canting enhances the cartridge retention of the shelves in that the rearward canting strongly resists forces, such as may result from accidental jarrings or a shaking of the rack 10, which may otherwise tend to vibrate or shift the cartridges forwardly and off the shelf. Furthermore, if during removal of a tape cartridge from a shelf of the rack 10, the tape cartridge 12 is fumbled and dropped in any point in time prior to a displacing of the cartridge 12 relative to the corresponding shelf so that its center of gravity is positioned forwardly of the forward edge 68 of the shelf, the effect of gravity simply returns the cartridge 12 to the stored condition upon the shelf. Hence, the security of cartridge-retention is enhanced by the rearward inclination of each shelf support surface 64.

Another advantage provided by the aforedescribed rearward inclination of each support surface 64 relates to the ease with which a person searching for a desired tape cartridge 12 stored on the rack 10 can see the forward label-bearing edge 28 of cartridges 12 stored on the lowermost shelves 14,15. More specifically, the aforedescribed canting arranges each cartridge 12 so that its forward edge 28 faces forwardly and upwardly to the extent necessary to render the forward edge 28, and hence any identification label borne thereby, easily viewable by a person standing alongside and relatively close to the rack 10. This advantage can be readily appreciated when considering the fact that aisles or walkways defined between cartridge-storage racks are commonly narrow (often as small as twenty-four inches wide) so that a person searching for a desired cartridge stored upon a lowermost shelf of such a rack cannot stand away from the rack and be able to scan the identification labels of cartridges stored adjacent the bottom of the rack. Instead, the person is compelled to stand close to the front of the rack and, as is the case with common conventional floor-standing racks, is therefore required to stoop or bend over in order to read the labels of the cartridges stored near the floor. In contrast, the aforedescribed structure of the rack 10 which arranges cartridges 12,12 stored thereon so that the cartridge forward edges 28 are directed upwardly and forwardly enables a person standing alongside the rack 10 to remain standing while viewing the forward edges 28 and any identification label borne thereby of cartridges positioned upon the lowermost shelves 14,15.

Still another advantage of the rack 10 relates to the superposed relationship of the shelves therein wherein one shelf is positioned generally above an underlying shelf. More specifically, the shelves along each side of the rack 10 are stacked in a substantially vertical relationship yet the forward, or label-bearing, edge 28 of each cartridge 12 is viewable due to the aforediscussed inclination of the shelves, by a person standing alongside the rack 10 even if the cartridges 12 to be viewed are mounted upon the lowermost shelves 14,15. At least one conventional floor-standing rack has lowermost shelves which are stacked in a non-vertical relationship so that each of the lowermost shelves protrudes forwardly of the shelf arranged immediately above. Such a non-vertical stacking of lowermost shelves is believed to arrange cartridges stored thereupon in a condition for easy reading of identification labels borne thereby, but such a conventional rack is relatively wide at the base to accommodate such a non-vertical stacking of shelves. In cartridge-storing rooms in which floor space is commonly costly due to air-conditioning, security, and fire-prevention requirements and due to the fact that the cartridges stored therein must commonly be readily accessible to a user and hence stored relatively close to anticipated user personnel, the floor space required by such a conventional wide-based rack may be undesirable. In contrast, however, the stacked relationship of the shelves of the rack 10 permits the rack 10 to be relatively narrow (i.e., sixteen inches wide) as measured between forward and rearward edges 42,44 of the side support 32 or 34 so that the rack 10 requires a smaller floor space than does the conventional wide-based rack discussed above and therefore is believed to be well-suited for use in costly cartridge-storage rooms.

It will be understood that numerous modifications and substitutions can be had to the aforedescribed embodiment without departing from the spirit of the invention. For example, although the rack 10 of FIGS. 1–6 has been shown and described as a stationary structure including a plurality of shelves in superposed relationship so that the forward edge 28 of every shelf 14–18 is contained within a single vertically-oriented plane, a rack in accordance with this invention can be a movable structure in which a plane containing the forward edges of each rack shelf is slightly inclined to the vertical. For example, there is shown in FIGS. 7 and 8 an alternative embodiment, generally indicated 90, of a rack in accordance with the present invention in the form of a shelf-defining truck 100 for storing magnetic tape cartridges and transporting the cartridges from one site to another. The truck 100 includes shelves 102–105, respectively, each defining a forward edge 96. As best shown in FIG. 8, each forward edge 96 of the shelves 102–105 is contained within a single plane, indicated P, oriented at an angle, indicated Q, relative to the vertical, indicated V. In the truck 100, the angle Q is about ten degrees. Accordingly, the aforedescribed rack embodiment 10 of FIGS. 1–6 is intended for the purpose of illustration and not as limitation.

I claim:

1. A storage rack for magnetic tape cartridges comprising:

shelf means including at least two shelves for supporting a plurality of tape cartridges in an upstanding, side-by-side relationship, each of said shelves including means defining a platform for tape cartridges for operatively positioned thereupon and means defining a back for the shelf, said platform including means defining a cartridge-supporting plane adapted to be overlain by an edge of a cartridge operatively positioned upon the platform and said platform extending forwardly of the corresponding back and terminating in a substantially linear forward edge, and means for supporting said shelves in a superposed relationship so that one shelf is positioned generally above the other shelf, the forward edge of each shelf is arranged substantially horizontally and each shelf platform is oriented so that the edge of a tape cartridge operatively overlying the platform is canted rearwardly and downwardly from the corresponding forward edge so that the overlying cartridge edge defines an acute angle with the horizontal, said acute angle being within the range of about ten to twenty degrees so that the aforesaid canting of the overlying cartridge edge enhances the retention of the cartridge by the underlying platform, the forward edge of each shelf arranged so as to be overhung by the overlying edge of a cartridge stored thereupon and the platform-defining means of one shelf being spaced above the platform-defining means of said other shelf a distance which is substantially no greater than the vertical height of a cartridge when positioned upon said other shelf and measured from the corresponding forward edge plus an amount providing finger clearance between the underside of the platform-defining means of said one shelf and the upper edge of a cartridge when positioned upon said other shelf so that the index finger of one hand can be placed atop a cartridge stored upon said other shelf at a location on the cartridge adjacent the upper, forward corner thereof and the cartridge pivoted forwardly with the index finger relative to said other shelf as the overlying cartridge edge moves in rolling contact about the corresponding forward edge from a stored condition upon the other shelf to a forwardly-tilted condition in relationship to adjacent cartridges so that the opposite sides of the cartridge can be grasped between the thumb and remaining fingers of the one hand for purposes of withdrawing the cartridge from said other shelf, the depth of each platform as measured between its forward edge and the corresponding back and generally in its cartridge-supporting plane being in the range of about 0.75 to 0.90 times the length of the overlying cartridge edge so that the amount of the overlying cartridge edge overhanging the platform forward edge is large enough to facilitate the aforesaid forward pivoting of the cartridge yet small enough so that the remainder of the cartridge edge which directly overlies the platform is large enough to enhance the stability of the cartridge when stored upon the platform.

2. A rack as defined in claim 1 wherein the forward edge of each shelf is contained in a single plane and said single plane defines one angle with the vertical within the range of about zero to ten degrees.

3. A rack as defined in claim 2 wherein said one angle is about zero degrees.

4. A rack as defined in claim 1 wherein each platform includes means defining a planar surface upon which tape cartridges rest when operatively positioned thereupon, each forward edge being contained within the plane of the corresponding planar surface, and the plane of each planar surface defining the aforesaid acute angle with the horizontal.

5. A rack as defined in claim 4 wherein each platform includes a cartridge-supporting portion adapted to be overlain by the edge of a cartridge operatively positioned upon the platform and each cartridge-supporting plane is defined by a corresponding cartridge-supporting portion.

6. A rack as defined in claim 1 wherein said depth of each platform being about 0.83 times the length of the overlying cartridge edge.

7. A rack as defined in claim 1 wherein the platform-defining means of one shelf is spaced a sufficient distance above the platform-defining means of said other shelf so that a cartridge stored upon said other shelf can be pivoted about the corresponding forward edge from the stored condition through at least ten degrees of angular displacement before the cartridge engages the platform-defining means of said one shelf.

8. A rack as defined in claim 7 wherein the angular displacement through which the cartridge can be pivoted about the forward edge lies within the range of about ten to thirty degrees.

9. A rack as defined in claim 1 wherein each platform includes a first planar surface defining said cartridge-supporting plane and said back includes a second planar surface, said first and second planar surfaces defining a right angle with one another.

10. A rack as defined in claim 1 wherein said shelf means includes means defining a plurality of relatively thin partitions disposed along the length of each shelf for dividing each platform into separate cartridge-receiving compartments, each of said compartments adapted to closely accept a cartridge inserted endwise therein.

11. A rack as defined in claim 1 wherein said shelf means includes at least three shelves each including platform-defining means and said three shelves are supported in a superposed relationship by said supporting means so that the platforms defined by said shelf platform-defining means are arranged in a generally vertically-stacked and generally parallel relationship and the vertical spacing defined between the platform-defining means of two adjacent shelves is substantially equal in distance to that of the vertical spacing defined between the platform-defining means of the other two adjacent shelves.

12. A rack as defined in claim 1 wherein said supporting means includes a pair of upstanding side members adapted to rest upon a floor for supporting said rack as a free-standing structure and a top member spanning the side members at the upper end thereof, said shelves extend between so as to be supported by said side members in spaced superposed relationship so that said top member is positioned immediately above said one shelf and said one shelf is positioned immediately above said other shelf, said top member being spaced above said platform-defining means of said one shelf a distance which is substantially equal to the spacing distance as measured between the platform-defining means of said other shelf so that vertical storage density of cartridges supported by said rack is enhanced.

13. A rack as defined in claim 2 wherein said one and other shelves comprise a first set of shelves which open to one side of said rack and said shelf means includes a second set of shelves supported by said supporting means in superposed relation and which each open to the opposite side of said rack, each shelf in said second set being arranged in a back-to-back relationship with a corresponding shelf of said first set so that cartridges can be stored on both sides of said rack.

14. In combination:
a storage rack including at least two shelves arranged in superposed relationship wherein one of said shelves is disposed generally above the other of said shelves, each of said shelves including means defining a platform and a back for the shelf, each platform defining a cartridge-supporting plane and extending forwardly of the corresponding back and terminating in a substantially linear forward edge for the corresponding shelf; and
a plurality of magnetic tape cartridges operatively stored upon the platform of said other of said shelves in an upstanding, side-by-side relationship, each of said cartridges including a bottom edge supportedly overlying said other shelf platform, said other shelf supporting said cartridges so that said bottom edge of each cartridge is inclined along a path extending between said leading edge and a point oriented rearwardly and downwardly from said forward edge so that said path defines an acute angle with the horizontal wherein said acute angle is within the range of about 10 to 20 degrees so that the aforesaid inclination of the overlying cartridge edge enhances the retention of the cartridge by the underlying platform, and said other shelf platform being of such size in relationship to said cartridges that said bottom cartridge edge overhangs the corresponding forward edge, said one shelf being spaced above each of said cartridges a distance which is substantially no greater than the distance necessary to provide a finger clearance between the bottom of the platform-defining means of said one shelf and the upper edge of any cartridge positioned upon said other shelf so that the index finger of one hand can be placed atop one of said cartridges at a location on said one cartridge adjacent an upper, forward corner thereof and said one cartridge pivoted forwardly with the index finger relative to said other shelf as said one cartridge moves in rolling contact shelf and about said forward edge of said other shelf platform from the stored condition upon said other shelf to a forwardly-tilted condition at which portions of the opposite sides of said one cartridge protrude forwardly in relationship to cartridges positioned adjacent said one cartridge so that the sides of said one cartridge can be grasped between the thumb and remaining fingers of the one hand for purposes of removing said one cartridge from said other shelf, the depth of each platform as measured between its forward edge and the corresponding back and generally in its cartridge-supporting plane being in the range of about 0.75 to about 0.90 times the length of the overlying cartridge edge so that the amount of cartridge edge overhanging the platform forward edge is large enough enough to facilitate the aforesaid forward pivoting of the cartridge yet small enough so that the remainder of the cartridge edge which directly overlies the platform is large enough to enhance the stability of the cartridge when stored upon the platform.

15. The combination of claim 14 wherein the forward edge of each shelf is contained in a single plane and said single plane defines one angle with the vertical within the range of about zero to ten degrees.

16. The combination of claim 15 wherein said one angle is about zero degrees.

17. The combination of claim 14 wherein the platform-defining means of said one shelf is spaced a sufficient distance above the platform-defining means of said other shelf so that a cartridge stored upon said other shelf can be pivoted about the corresponding forward edge from the stored condition through at least ten degrees of angular displacement before the cartridge engages the platform-defining means of said one shelf.

18. The combination of claim 17 wherein the angular displacement through which the cartridge can be pivoted about the forward edge lies within the range of about ten to thirty degrees.

19. The combination of claim 14 wherein said other shelf includes means defining a plurality of relatively thin partitions disposed along the length of said other shelf for dividing the platform of said other shelf into separate compartments, at least one of said partitions cooperating with two cartridges positioned on opposite sides of said one partition to permit said two cartridges to engage one another and thereby provide a cartridge-storing capacity of maximum horizontal density along the length of said other shelf.

20. The combination of claim 19 wherein each cartridge includes means defining two opposite side faces and a rib protruding from one of said side faces and spaced from said bottom edge for engaging a first side face of the cartridge positioned adjacent said one side face so that a region is defined between said one end first side faces of said cartridges and generally beneath said rib and said one partition is positioned within said defined region.

21. A rack as defined in claim 14 wherein said shelf means includes at least three shelves each including platform-defining means and said three shelves are supported in a superposed relationship by said supporting means so that the platforms defined by said shelf platform-defining means are arranged in a generally vertically-stacked and generally parallel relationship and the vertical spacing defined between the platform-defining means of two adjacent shelves is substantially equal in distance to that of the vertical spacing defined between the platform-defining means of the other two adjacent shelves.

22. A rack as defined in claim 14 wherein said supporting means includes a pair of upstanding side members adapted to rest upon a floor for supporting said rack as a free-standing structure and a top member spanning the side members at the upper end thereof, said shelves extend between so as to be supported by said side members in spaced superposed relationship so that said top member is positioned immediately above said one shelf and said one shelf is positioned immediately above said other shelf, said top member being spaced above said platform-defining means of said one shelf a distance which is substantially equal to the spacing distance as measured between the platform-defining means of said other shelf so that vertical storage density of cartridges supported by said rack is enhanced.

23. A rack as defined in claim 22 wherein said one and other shelves comprise a first set of shelves which open to one side of said rack and said shelf means includes a second set of shelves supported by said supporting means in superposed relation and which each open to the opposite side of said rack, each shelf in said second set being arranged in a back-to-back relationship with a corresponding shelf of said first set so that cartridges can be stored on both sides of said rack.

* * * * *